May 14, 1963 R. H. PARK 3,089,186
APPARATUS FOR BLOW MOLDING HOLLOW ARTICLES
Original Filed July 14, 1954 2 Sheets-Sheet 2
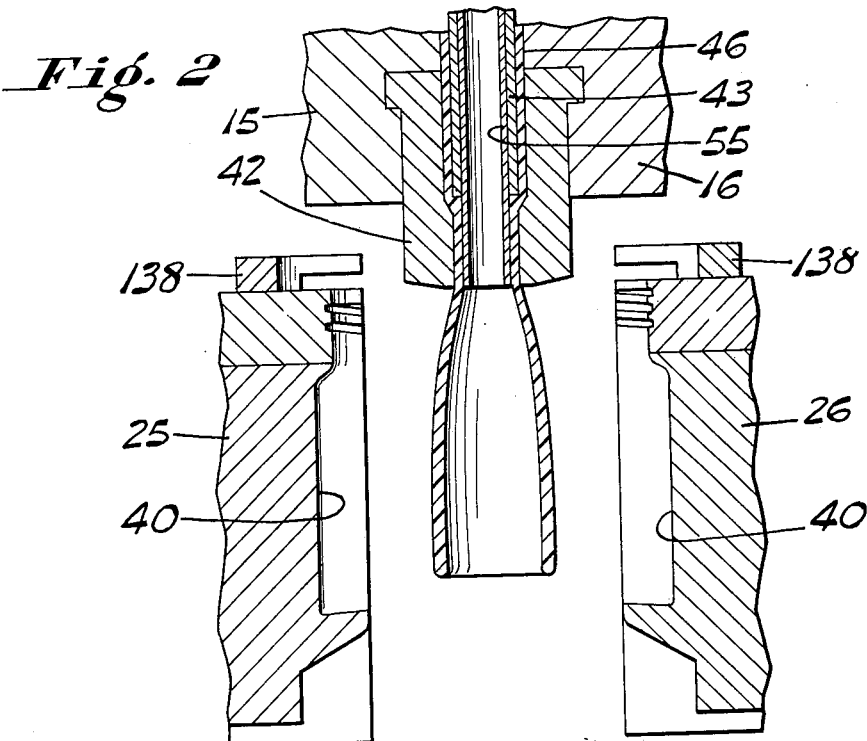
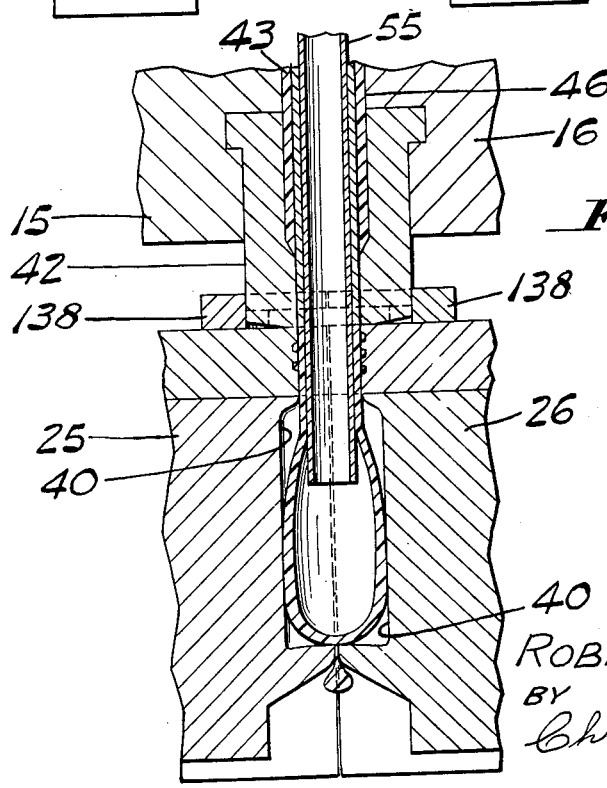
INVENTOR.
ROBERT H. PARK
BY
Christel & Bean
ATTORNEYS.

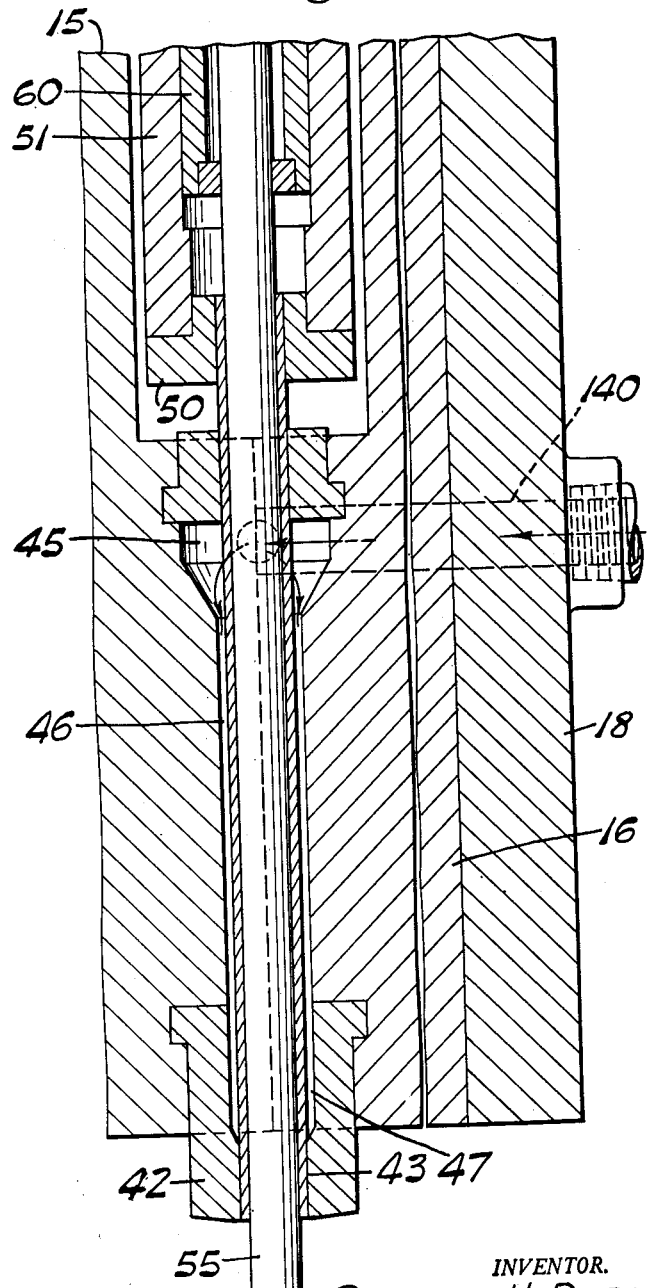

United States Patent Office 3,089,186
Patented May 14, 1963

3,089,186
APPARATUS FOR BLOW MOLDING HOLLOW
ARTICLES
Robert H. Park, Dennis, Mass., assignor to Brockway
Glass Company, Inc., Brockway, Pa.
Original application July 14, 1954, Ser. No. 443,272, now
Patent No. 3,008,191, dated Nov. 14, 1961. Divided
and this application Aug. 21, 1961, Ser. No. 132,971
8 Claims. (Cl. 18—5)

This invention relates to a method of forming hollow plastic articles, such as thermoplastic containers, by a combination of forming and blowing steps.

This application is a division of my copending application, Serial No. 443,272 filed July 14, 1954, now Patent No. 3,008,191, dated November 14, 1961.

In general, the method of the present invention relates to the production of thermoplastic bottles by extruding a thermoplastic blank or parison in tubular form and in a plastic condition, pinching the leading end of the plastic tube to close the same or closing such leading end by other means, and then introducing air pressure within the closed ended tube to expand the same into a mold cavity of the shape of the desired exterior shape of the container.

An important feature of the present invention resides in the method by which the partially formed container or material for forming such a container is separated from the parent body of plastic material. Further, and in conjunction with such novel severance of the material, there is provided a novel method for finish forming the entrance end of the container, usually referred to in this art as the "finish" of the container. The method employed in this connection is such that a minimum of extraneous finishing or trimming steps are necessary.

Numerous other objects and advantages of the method and apparatus of the present invention will become apparent to those skilled in the present art from a consideration of the following detailed specification and the accompanying drawings. However, it is to be understood that the form of the present invention herein set forth is by way of example only and that the principles of the present invention are not limited thereto, or otherwise than as defined in the appended claims.

In the drawings:

FIG. 1 is a vertical central cross-sectional view through an extrusion orifice and blow tube of the present invention;

FIG. 2 is a fragmentary cross-sectional view taken in the same vertical plane as FIG. 1 showing mold means in conjunction therewith and showing one phase of a cycle of operation; and FIG. 3 is a view similar to FIG. 2 showing a subsequent phase of a cycle of operation.

In the apparatus shown herein by way of example only that portion is shown and described which is more or less peculiar to the apparatus of the present invention and enough of the surrounding and cooperating mechanism to fully illustrate the principles of the invention and to enable those skilled in the art to construct apparatus satisfactory for carrying out the method of the invention. The various movable mold parts may be operated manually, within the purview of the present invention, or semi-automatic or automatic means may be provided for producing partial or full cycles of operation, with partial manual control or manipulation or without any manual intervention. Given the apparatus and mold structure illustrated by way of example, the modification of the apparatus for manual, semi-automatic or fully automatic operation would be a mere matter of routine design to those skilled in the plastic molding and extrusion arts.

Like characters of reference denote like parts throughout the several figures of the drawings. The extrusion and blowing portion of the form of apparatus illustrated herein by way of example comprises a relatively fixed structure consisting of a pair of blocks 15 and 16 which are clamped to each other by a pair of plates 18 lying at opposite sides of the blocks 15 and 16.

The blocks 15 and 16 are made separately and attached as shown, mainly so that they may be disassembled for cleaning, when necessary, and for interchanging certain of the extrusion and blowing instrumentalities to adapt the apparatus for the manufacture of articles of various sizes and proportions.

A pair of relatively separable complementary mold parts designated 25 and 26 underlie the blocks 15 and 16 and are mounted for opening and closing movement.

The mold blocks 25 and 26 are provided, at their meeting surfaces, with a pair of cavities 40 which combine to form a chamber or cavity for molding a container, which in the illustrated instance is a bottle element having a relatively narrow neck portion.

As indicated previously herein, the blocks 15 and 16 of the extrusion and blowing apparatus are provided with a vertical bore whose axis lies in the plane of separation of the blocks 15 and 16 and this bore is axially aligned with the cavity 40 of the mold parts 25 and 26. The lower portion of this bore is enlarged and formed to receive an extrusion orifice bushing 42 having a central opening whereby to form an extrusion ring.

Referring particularly to FIG. 1, a tubular member or sleeve 43 has its lower end disposed generally within the orifice bushing 42, the lower end of each sleeve 43 having a fairly close axially sliding fit in the lower end of the orifice bushing 42, as shown. One of the functions of sleeve 43 is to cut off the flow of plastic material to the molding apparatus in proper timed relation with the other operating parts and accordingly the sleeve 43 shall hereinafter be referred to as the degating sleeve.

The vertical bore in the blocks 15 and 16 is provided with an annular ring gate formation 45 and a bore portion 46 extending downwardly therefrom is of greater diameter than the outside diameter of degating sleeve 43 to form an elongated annular passageway through which plastic material is fed downwardly from the ring gate 45. The annular plastic passageway thus formed continues downwardly into the upper portion of the orifice bushing 42 as enlarged bore portion 47.

The degating sleeve 43 functions to sever an extruded portion of plastic material from the parent body, as indicated above, and cooperates to form a finish at the top of the neck of the container. This finish may have a flat radial upper surface or the lower end of degating sleeve 43 may be shaped to form an upper finish of any other desired form. In the form of the present invention set forth herein by way of example the degating sleeve 43 functions as a plastic metering member, particularly during its downward movement through the lower orifice portion of the bore in the bushing 42 following the actual cut off of plastic flow from the feed passage 46, 47.

In performing its degating function and in cooperating to finish form the top end of the container the degating sleeve 43 is arranged to move vertically upwardly and downwardly in a certain sequence relationship with the operation of other parts of the extruding and forming apparatus. To this end the top end of the degating sleeve is securely fitted into a collar or bushing 50 which is in turn fitted into the lower end of a cylindrical member 51.

A further tubular member 55 is disposed within degating sleeve 43 and the exterior periphery of the lower portion of tubular member 55 forms the inner periphery of the annular extrusion orifice and thus forms what is referred to later herein as an extrusion mandrel. In addition to cooperation with the lower bore portion of the orifice bushing 42 to form the annular extrusion orifice and thus provide an extrusion mandrel, the tubular member 55 serves as conduit for conducting blowing air to the extruded tube of plastic material to blow the same into conformity with the mold cavity 40. Accordingly, tubular member 55 shall hereinafter be referred to either as an extrusion mandrel or a blow tube.

The degating sleeve hollow cylindrical member 51 has positioned therein for vertical sliding movement, a second hollow cylindrical blow tube supporting member 60.

A pair of centering plates 138 are positioned at the tops of the mold parts 25 and 26 and are provided with half round cut outs at their meeting edges, as viewed in plan, of the same outside radius as the radius of the lower end of the orifice bushing 42 and concentric therewith. Thus closing movement of the mold parts causes the cut outs in plates 138 to embrace the orifice bushings 42 to insure accurate axial alignment of the extrusion apparatus and the mold parts.

The following description will be directed only to the functional vertical movements of the blow tube and the degating sleeve without particular reference to the manner in which those movements are brought about.

The cycle of operation about to be described and a number of variations thereof have been successfully practiced with manual control means and a large number of satisfactory containers have been produced thereby. However, as stated in the preamble hereto, it is to be understood that the movements referred to in the following description may be part of an automatic sequence of operation which may be reproduced by cam operation of the blow tube and degating sleeve movements or by fluid cylinder operation thereof or a combination of both or by any other of the well known mechanical power means for reproducing cycles of operation in machines of this general class.

In describing a specific cycle of operation by way of example reference will be had particularly to FIGS. 3 and 4. As shown in FIG. 3 degating sleeve 43 is raised to provide an open annular path for the downward flow of plastic material through orifice bushing 42 and blow tube 55 is shown with its lower end substantially at the plane of the lower end of the extrusion bushing 42.

With the parts in this position plastic is fed inwardly through a sprue 140 to the ring gate 45, and thence downwardly.

The manner in which the plastic material is forced through the feed passages at this cycle of operation forms no part of the present invention and in the manual mechanism illustrated in the drawings may be effected, as is common in manually operated plastic molding machines of conventional form, by manual actuation of a pressure injection piston, or in any other desired manner.

The following description of the method has reference to certain dimensions in referring to movements of the blow tube and the degating sleeve. These references are merely representative and by way of disclosing one specific and fully operative method. Nevertheless, in the interests of such full disclosure it may be stated that the containers blown in the apparatus described, in the specific example set forth in the application, have generally rectangular body portions about one and three-quarter inches high, about one and one-half inches wide and about three-quarters of an inch thick and the generally cylindrical neck portions are about three-quarters of an inch high and about one-half inch in outside diameter.

In the method which is now being set forth by way of example a tube of plastic material is extruded until it approaches the bottom of the cavity 40 of the blow mold, say within one-half or three-quarters of an inch, as indicated generally in FIG. 2. At this time the forcible injection of plastic material through the sprue 140 and the ring gates 45 is terminated.

At this point in the exemplary method and before closing of the mold parts the blow tube 55 is lowered and, in the present instance, such lowering movement may be accompanied by a lesser downward movement of degating sleeve 43. By way of example this downward movement of the blow tube 55 may be about one and one-quarter inches with an accompanying downward movement of the degating sleeve of something less than one inch.

This downward movement of the degating sleeve 43 pumps plastic material out of the extrusion orifice and at the same time the greater downward movement of the blow tube 55 draws the extruded tube downwardly to attenuate the same, thus producing a tube whose upper portion is thinner walled than the thickness of the extrusion orifice with the tube hugging the blow tube closely from the extrusion orifice downwardly to a point near the bottom of the blow tube where the extruded tube flares outwardly to a larger diameter as shown in FIG. 3.

At this time the mold parts have not yet closed as shown in FIG. 3. but the bottom end of the extruded tube has moved below the bottom of the mold cavity a sufficient distance to cause the bottom of the extruded tube to be pinched and thus closed at the bottom edge of the mold cavity upon closure of the mold parts.

Reference to downward movement of one and one quarter inches in the movement of the blow tube 55 is by way of example only. This downward movement will vary with the kind of plastic material being used, the degree of plasticity, the temperature of the material, the rate of heat dissipation, the physical proportions of the article being formed, and other circumstances and conditions. The critical thing is that the blow tube moves down such a distance that the flare of the extruded tube is below the lowest part of the generally cylindrical portion of the neck or finish mold to avoid the pinching referred to above upon closure of the mold parts.

It will be noted that, before blow tube 55 is moved downwardly at all, the flare of the extrusion tube begins at the bottom of the extrusion orifice which is then level with the bottom of the blow tube, so that the top of the flare moves upwardly along he blow tube during downward movement of the blow tube. This may be due to sliding of the extruded tube above the flare along the blow tube during this downward movement or the extent of the flare along the tube may increase during such operation. Whatever the reason, due allowance for this must be made in determining the relative movements of the parts and the proportioning of the extrusion as to length in various phases of its formation.

The foregoing variables and others will affect the required or desirable degrees and proportionings of such downward movements of the blow tube and the degating sleeve in properly forming and positioning the extrusion before the subsequent molding operation. The foregoing downward movement of degating sleeve 43 in the present instance brings the lower surface of the same down to or slightly into the top of the neck portion of the cavity whereby the finish of the bottle or other container is substantially fully molded in the top finish mold defined by the neck portion of the cavity, the exterior periphery of the blow tube, and the lower end of the degating sleeve 43.

At the point in the present method described above the mold parts 25 and 26 close and pinch the bottom of the extruded tube at the bottom edge of the mold cavity to close off the extruded tube as shown in FIG. 3. If the finished container were formed at this time by introducing blowing air through the blow tube 55, the shoulder portion of the container might be unduly thin due to the fact that the flare of the extruded tube is substantially below the bottom end of the neck portion of the mold cavity and the smaller proportions of the tube above the flare will result in undue attenuation of the wall thereof in blowing to form the shoulder portion of the container.

In general it will be necessary or desirable in the preceding step, wherein the blow tube is moved downwardly, to move the flare portion substantially below the bottom of the neck cavity to insure against pinching upon closure of the mold. Accordingly, it will normally be desirable at this time, following closing of the mold parts, to raise the blow tube 55 about a quarter of an inch or in any event enough to effect contact of the flare portion of the tube with the top of the blow cavity or the bottom of the cylindrical part of the neck mold, what may be referred to as the shoulder portion of the mold.

During this movement the degating sleeve 43 may be locked against any vertical movement. Following this raising of the blow tube, if such raising is practiced, or in any event following the closing of the mold parts, blowing air will be introduced downwardly through the blow tube 55 to blow the body portion of the container into fully molded conformity with the body mold cavity.

Just prior to the lifting of the blow tube referred to above the degating sleeve 43 may be moved downwardly a slight amount to finally and cleanly form the finish of the container. The degree of such downward movement will vary with different kinds of containers and materials and in any event the neck portion of the mold cavity will be designed to extend above the top of the finished article a sufficient degree to permit the desired degree of entering movement of the lower end of the degating sleeve into the neck mold cavity.

Following the initiation of the blowing operation the blow tube 55 may be raised, either suddenly or gradually, to a point where its bottom end is either somewhat below or somewhat above the bottom end of the degating sleeve 43. It is not essential to raise the blow tube 55 at this phase of operation but such raising tends to insure filling of the neck mold, both as to thread openings and the top finish and the raising also facilitates removing the blow tube from the finished article.

The alternative function of the filling of the neck mold threads and the top finish by this raising of the blow tube is to some extent supplementary to or interchangeable in whole or in part with the above mentioned final lowering of the degating sleeve 43. That is, such final lowering of the degating sleeves accomplishes or contributes to much the same result as to the final forming of the top finish and the filling of the thread cavities of the neck mold.

These two expedients may be used alternatively or both may be used to contribute to the same general objects and, under certain conditions of operation, neither of these steps may be required to fill the neck mold cavity completely. As a further alternative, the lowering of the degating sleeve may take place in conjunction with this latter raising of the blow tube at the phase of the manufacturing cycle which is now being described, namely, the step following the blowing of the article.

I claim:

1. Apparatus for forming open-ended hollow articles from plastic material, said apparatus comprising mold means including a cavity having an open end, extrusion means for supplying material in a plastic state to the mold means by extruding a tube of the material to be formed in the cavity, said extrusion means comprising an extrusion member having an extrusion orifice therein and a coaxial extrusion mandrel movable axially to extend into the open end portion of the cavity, and a sleeve member independently movable in the annular space formed by said extrusion orifice and said extrusion mandrel and to the outer end of the cavity to form a neck mold cavity wherein the open end portion of the article is formed at its end face by said sleeve member, externally by said cavity, and internally by said extrusion mandrel.

2. Apparatus for forming open-ended hollow articles from plastic material, said apparatus comprising mold means including a cavity having an open end, extrusion means for supplying material in a plastic state to the mold means by extruding a tube of the material to be formed in the cavity, said extrusion means comprising an extrusion member having an extrusion orifice therein and a coaxial extrusion mandrel movable axially to extend into the open end portion of the cavity, a sleeve member independently movable in the annular space formed by said extrusion orifice and said extrusion mandrel and to the outer end of the cavity to form a neck mold cavity wherein the open end portion of the article is molded at its end face by said sleeve member, externally by said cavity and internally by said extrusion mandrel, said extrusion mandrel having an axial passage therein, and means for blowing air into the extruded tube through said passage to expand the portion thereof beyond said molded end portion into external conformance with said cavity.

3. Apparatus for forming open-ended hollow articles from plastic material, said apparatus comprising separable mold means including a cavity having an open end, extrusion means for supplying material in a plastic state to the mold means by extruding a tube of the material to be formed in the cavity, said extrusion means comprising an extrusion member having an extrusion orifice therein and a coaxial extrusion mandrel movable axially to extend into the open end portion of the cavity, means for closing the mold means to pinch the lower end of said tube at the lower end of the cavity, a sleeve member independently movable in the annular space formed by said extrusion orifice and said extrusion mandrel and to the outer end of the cavity to form a neck mold cavity wherein the open end portion of the article is molded at its end face by said sleeve member, externally by said cavity and internally by said extrusion mandrel, said extrusion mandrel having an axial passage therein, and means for blowing air into the extruded tube through said passage to expand the portion thereof beyond said molded end portion into external conformance with said cavity.

4. Apparatus for forming open-ended hollow articles from plastic material, said apparatus comprising separable mold means including a cavity having an open end, extrusion means for supplying material in a plastic state to the mold means by extruding a tube of the material to be formed in the cavity, said extrusion means comprising an extrusion member having an extrusion orifice therein and a coaxial extrusion mandrel movable axially to extend into the open end portion of the cavity, means for closing the mold means to pinch the lower end of said tube at the lower end of the cavity, and a sleeve member independently movable in the annular space formed by said extrusion orifice and said extrusion mandrel and to the outer end of the cavity to form a neck mold cavity wherein the open end portion of the article is molded at its end face by said sleeve member, externally by said cavity and internally by said extrusion mandrel.

5. Apparatus for forming open-ended hollow articles from plastic material, said apparatus comprising mold means including a cavity having a generally cylindrical open end, extrusion means for supplying material in a plastic state to the mold means by extruding a tube of the material to be formed in the cavity, said extrusion means comprising an extrusion member having an extrusion orifice therein and a coaxial extrusion mandrel, said mandrel having a cylindrical end portion movable axially into the open end portion of the cavity to form a hollow cylindrical mold space, and a sleeve member independently movable in the annular space formed by said extrusion orifice and said extrusion mandrel and into the outer end of said hollow cylindrical mold space to form a neck mold cavity wherein the open end portion of the article is formed at its end face by said sleeve member, externally by said cavity, and internally by said extrusion mandrel.

6. Apparatus for forming open-ended hollow articles from plastic material, said apparatus comprising mold means including a cavity having a generally cylindrical open end, extrusion means for supplying material in a plastic state to the mold means by extruding a tube of the material to be formed in the cavity, said extrusion means comprising an extrusion member having an extrusion orifice therein and a coaxial extrusion mandrel, said mandrel, having a cylindrical end portion movable axially into the open end portion of the cavity to form a hollow cylindrical mold space, a sleeve member independently movable in the annular space formed by said extrusion orifice and said extrusion mandrel and into the outer end of said hollow cylindrical mold space to form a neck mold cavity wherein the open end portion of the article is formed at its end face by said sleeve member, externally by said cavity, and internally by said extrusion mandrel.

7. Apparatus for forming open-ended hollow articles from plastic material, said apparatus comprising separable mold means including a cavity having a generally cylindrical open end, extrusion means for supplying material in a plastic state to the mold means by extruding a tube of the material to be formed in the cavity, said extrusion means comprising an extrusion member having an extrusion orifice therein and a coaxial extrusion mandrel, said mandrel having a cylindrical end portion movable axially into the open end portion of the cavity to form a hollow cylindrical mold space, means for closing the mold means to pinch the lower end of said tube at the lower end of said cavity, and a sleeve member independently movable in the annular space formed by said extrusion orifice and said extrusion mandrel and into the outer end of said hollow cylindrical mold space to form a neck mold cavity wherein the open end portion of the article is formed at its end face by said sleeve member, externally by said cavity, and internally by said extrusion mandrel.

8. Apparatus for forming open-ended hollow articles from plastic material, said apparatus comprising separable mold means including a cavity having a generally cylindrical open end, extrusion means for supplying material in a plastic state to the mold means by extruding a tube of the material to be formed in the cavity, said extrusion means comprising an extrusion member having an extrusion orifice therein and a coaxial extrusion mandrel, said mandrel having a cylindrical end portion movable axially into the open end portion of the cavity to form a hollow cylindrical mold space, means for closing the mold means to pinch the lower end of said tube at the lower end of said cavity, a sleeve member independently movable in the annular space formed by said extrusion orifice and said extrusion mandrel and into the outer end of said hollow cylindrical mold space to form a neck mold cavity wherein the open end portion of the article is formed at its end face by said sleeve member, externally by said cavity, and internally by said extrusion mandrel.

References Cited in the file of this patent

UNITED STATES PATENTS

| | | |
|---|---|---|
| 2,175,053 | Ferngren | Oct. 3, 1939 |
| 2,262,612 | Kopitke | Nov. 11, 1941 |
| 2,288,454 | Hobson | June 30, 1942 |
| 2,657,431 | Slaughter | Nov. 3, 1953 |
| 2,706,308 | Lorenz | Apr. 19, 1955 |
| 2,878,520 | Mumford et al. | Mar. 24, 1959 |
| 2,954,588 | Soubier | Oct. 4, 1960 |
| 3,008,191 | Park | Nov. 14, 1961 |

FOREIGN PATENTS

| | | |
|---|---|---|
| 1,030,004 | France | Mar. 11, 1953 |
| 692,590 | Great Britain | June 10, 1953 |